Nov. 11 1924.

E. B. HINDS 1,515,045

GEAR SHIFT

Filed Sept. 21, 1923   3 Sheets-Sheet 1

WITNESSES
Guy M Spring
George W. Wright

Inventor
EMERSON B. HINDS

By Richard B. Owen, Attorney

Nov. 11, 1924.

E. B. HINDS 1,515,045

GEAR SHIFT

Filed Sept. 21, 1923

WITNESSES

Inventor
EMERSON B. HINDS

By

Attorney

Patented Nov. 11, 1924.

1,515,045

UNITED STATES PATENT OFFICE.

EMERSON B. HINDS, OF DAYTON, OHIO.

GEAR SHIFT.

Application filed September 21, 1923. Serial No. 664,082.

*To all whom it may concern:*

Be it known that I, EMERSON B. HINDS, a citizen of the United States, residing at Dayton, in the county of Montgomery and State of Ohio, have invented certain new and useful Improvements in a Gear Shift, of which the following is a specification.

This invention appertains to motor vehicles and more particularly to the transmission mechanism thereof.

The primary object of the present invention is the provision of a novel attachment for automobiles, which is so constructed as to permit the controlling of a planetary gear transmission by the use of a hand shift lever, thereby obviating the necessity of operating the transmission by the reverse and clutch foot pedals and thus eliminating the inconveniences contingent therewith, such as holding the pedals down by the foot during the reversing of the car and when the car is in low speed.

A further object of the invention is to provide a novel attachment for automobiles of the planetary gear type, which will simplify the operation thereof and provide a smoother engagement of the control clutch.

A further object of the invention is to provide a novel attachment for controlling the transmission of an automobile embodying planetary gears by the use of hand shift lever, which can be connected to the standard parts of the transmission embodied in the automobile.

A still further object of the invention is to provide an improved attachment of the above character, which will be durable and efficient in use, one that will be simple and easy to manufacture, and one which can be placed upon the market and incorporated with a planetary gear transmission at a minimum cost.

With these and other objects in view, the invention consists in the novel construction, arrangement and formation of parts, as will be hereinafter more specifically described, claimed and illustrated in the accompanying drawings, in which drawings:

Referring to the drawings in detail, wherein similar reference characters designate corresponding parts throughout the several views the letter A generally indicates the improved transmission attachment and B a motor vehicle with which the same is associated.

Figure 1:
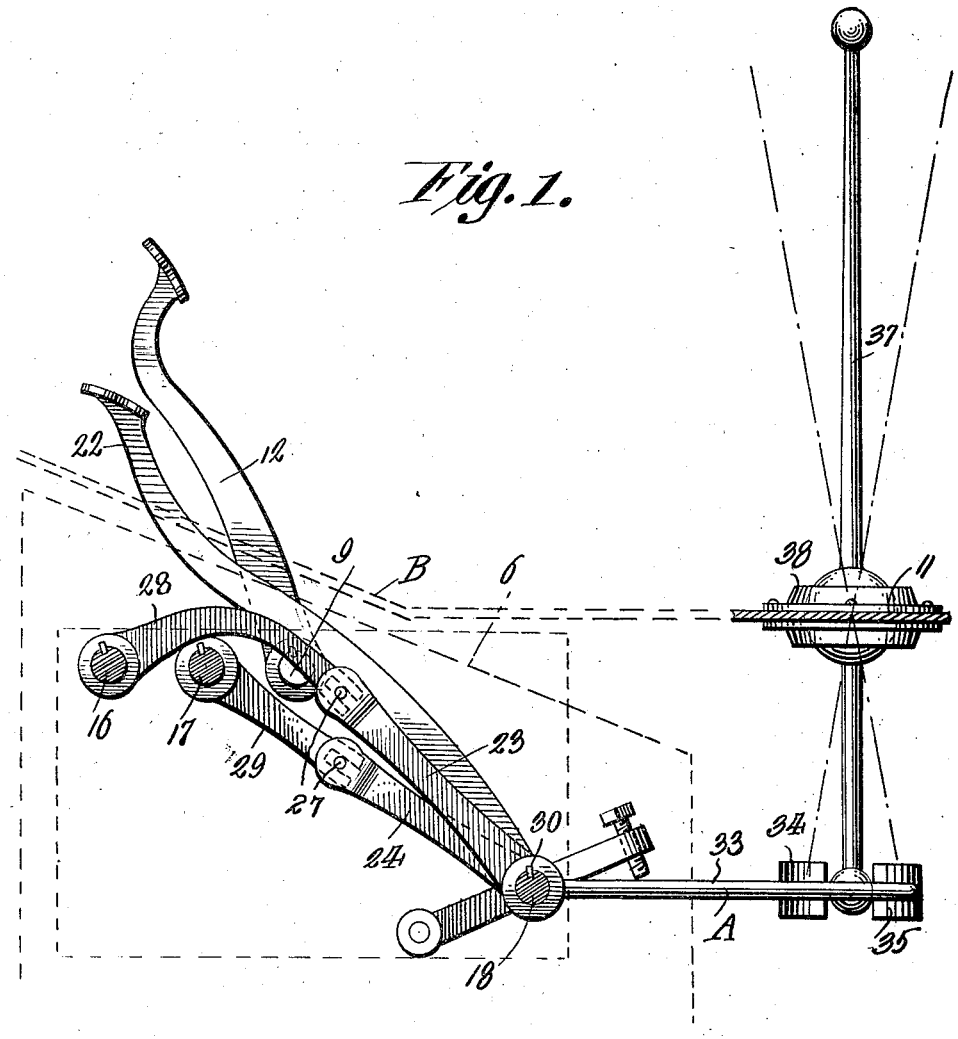
Figure 1 is a side elevation of the improved attachment showing the same incorporated with the standard part of a planetary gear transmission of a motor vehicle, parts of the vehicle being shown in section.

The motor vehicle B is of a well known type employing a planetary gear transmission and includes the side channel beams 5 of the chassis, the transmission housing 6, which is of the usual construction. As shown the transmission housing 6 has rockably mounted therein in the usual way, the spring controlled reverse pedal shaft 7, the spring controlled slow speed shaft 8, the spring controlled brake pedal shaft 9 and the clutch lever shaft 10. The shafts 7, 8, 9 and 10 protrude through one end of the transmission casing 6 and the shafts 7, 8 and 9 have usually attached thereto foot pedals, some of which in this instance are removed. The pedals ordinarily protrude through the floor 11 of the automobile.

In accordance with this invention the foot pedals are removed from the reverse shaft 7 and the slow speed shaft 8, but the brake pedal shaft 9, is provided with the usual foot operating pedal 12.

The improved attachment A comprises a supporting plate 15, which is bolted, riveted or otherwise secured to one of the side channel beams 5 of the motor vehicle B. This plate 15 forms a support for one side of the attachment, as will become hereinafter more fully apparent as the description proceeds. Shafts 16, 17 and 18 are provided for connection with the shafts 7, 8, and 10 respectively and it can be seen that the outer ends of shafts 16, 17 and 18 are rockably supported by the plate 15. The inner ends of the shafts 16 and 17 have feathered thereto connecting collars 19 and 20 respectively, which in turn are keyed to the outer ends of the shafts 7 and 8. The inner end of the shaft 18 is in turn rotatably connected to the collar 21 carried by the clutch lever shaft 10, which in turn carries the clutch lever for engaging the speed lever control (not shown) carried by the controller shaft also (not shown). The collars 19 and 20 are feathered to the shafts 16 and 17 so as to permit relative longitudinal movement to be had between the shafts 7 and 16 and the shafts 8 and 17 in view of the fact that certain sliding movements of the shafts 7 and 8 take place when these shafts are rotated. The clutch lever shaft member 18 has keyed thereto a clutch pedal 22, which is adapted to project through the floor 11 of the automobile B. The shaft 18 has rotatably mounted thereon a pair of control levers 23 and 24, and these levers have oppositely disposed clutch faces 25 and 26 formed thereon. The levers 23 and 24 are connected by means of a pin and slot connection 27 with levers 28 and 29, which are keyed or otherwise secured respectively to the shafts 16 and 17. Feathered on the shaft 18 for sliding movement thereon and rotary movement therewith are clutch collars 30 and 31 which are adapted to be moved into engagement with the clutch faces 25 and 26 formed on the levers 23 and 24 by means of control rods 32 and 33 which extend inwardly toward the center of the automobile. The clutch collar 31 is also adapted to be moved by the control rod 32 into engagement with the clutch face 21' formed on the collar 21. The inner ends of these control rods 32 and 33 are provided with yokes 34 and 35 respectively, which are adapted to be engaged at the option of the operator of the automobile by the ball end 36 of a hand lever 37. This hand lever 37 projects up through the floor 11 of the automobile and is swivelly connected thereto by means of the universal joint 38.

In operation of the improved device, the clutch pedal 22 is moved forwardly by the foot of the operator prior to the operation of the hand lever 37, as will be hereinafter more fully described. In the drawings, the hand lever 37 is shown in neutral position and the clutch pedal 22 pushed forwardly.

Figure 2:
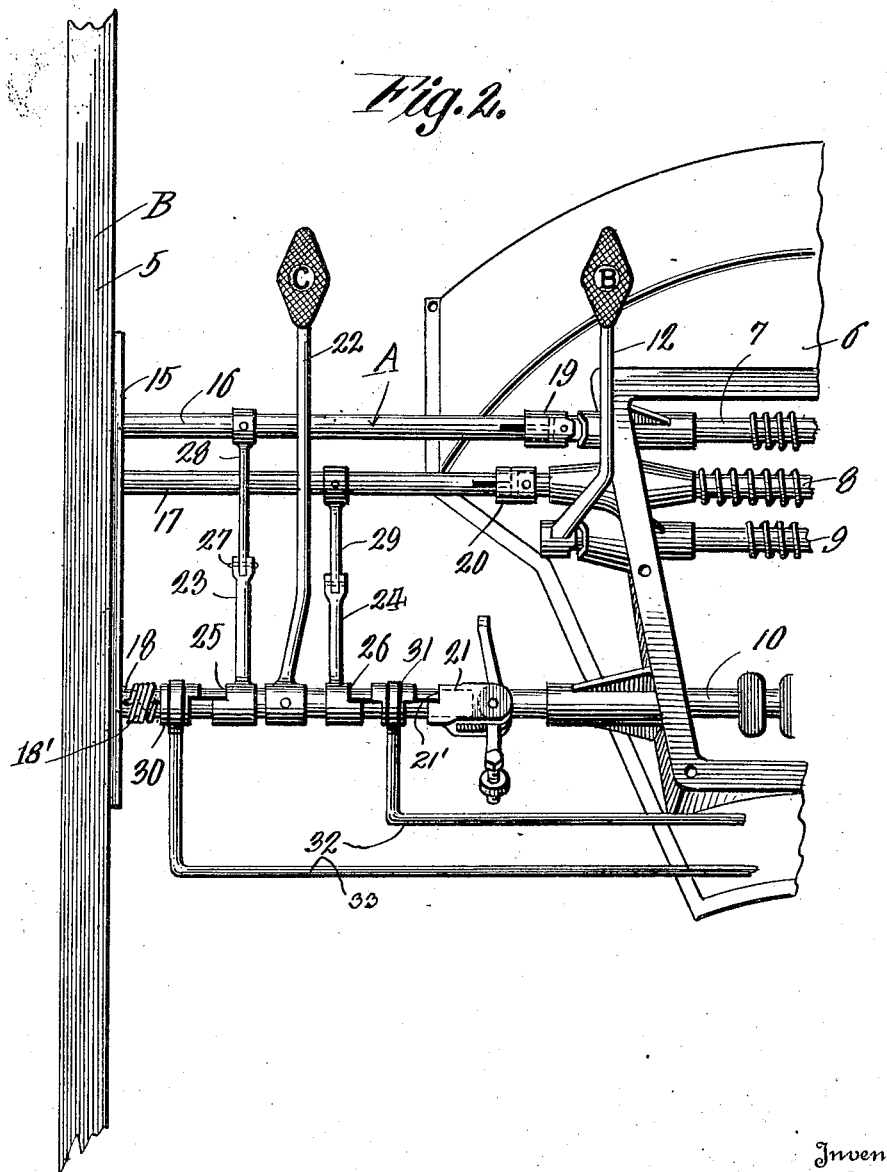
Figure 2 is a fragmentary top plan view of the improved attachment showing the same incorporated with the standard parts of a planetary gear transmission of a motor vehicle.
Figure 3:
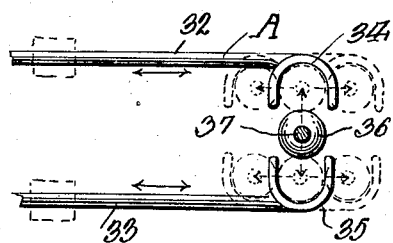
Figure 3 is a fragmentary top plan view of a portion of the improved attachment showing the connection of the shift lever with the operating parts of the attachment, the lever being shown in section.
Figure 4:
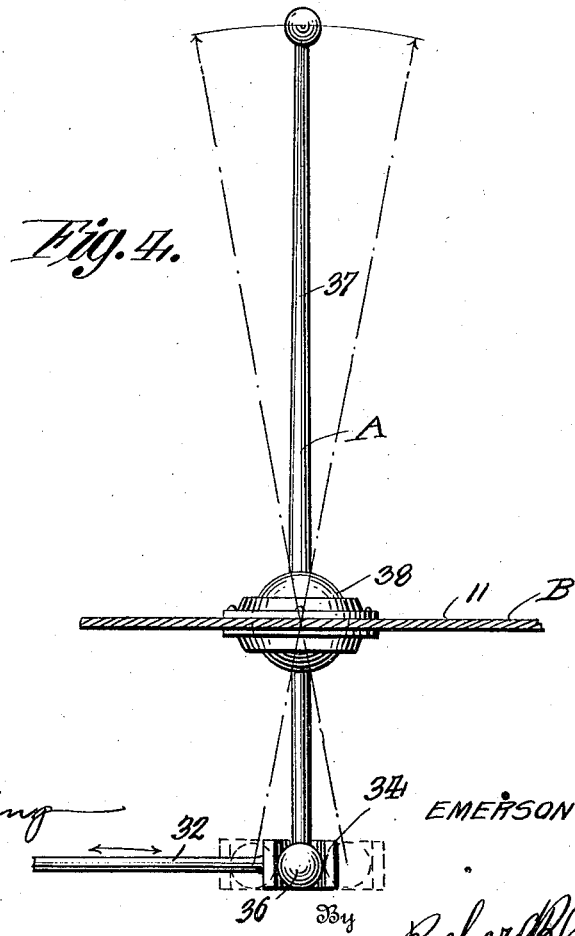
Figure 4 is a longitudinal fragmentary section through an automobile illustrating the connection of the shift hand lever with the floor of the automobile, and the connection between the shift lever with the operating rods of the attachment.

When it is desired to throw the car into reverse gear by means of the clutch hand lever 37, the hand lever 37 is grasped and swung so as to position the ball end 36 in the yoke 35 after which the lever is swung to the left, which will move the control rod 33 inwardly toward the center of the car and place the collar 30 in engagement with the clutch face 25 of the lever 23. The clutch pedal 22 is now released by the foot and the shaft 18 will rotate in a clockwise direction, viewing Figure 2 from the (left) by means of the spring 18', which has one end connected to the plate 15 and the other end to the shaft 18. The collar 30 will rotate with the shaft 18 and in view of the fact that the collar is in engagement with the lever 23, the shaft 16 will be turned in a counterclockwise direction thus engaging the reverse speed gear and throwing the car into reverse gear.

When it is desired to throw the car into high gear by means of the clutch lever 37, the pedal 22 is pressed forwardly by the foot, as in the first instance and the lever is grasped and moved so as to position the ball end 36 in engagement with the yoke 34 after which the lever is operated so as to move the control rod 32 to the right which will position the double clutch collar 31 in locking engagement with the clutch face 21' of the collar 21. This will lock the shaft 18 with the shaft 10 and upon release of the pedal 22 the shafts will rotate in unison under influence of the spring 18' and thus operate the high speed gear.

When it is desired to place the car in low speed the clutch pedal 22 is pushed forwardly as in the first instance and the control rod 32 is moved toward the left so as to engage the collar 31 with the clutch face 26 of the lever 24. This will lock the lever 24 with the shaft 18 for rotation therewith. Upon release of the foot pedal 22 the shaft 17 will be rotated through the connection of the crank or levers 24 and 29 thus rotating the shaft 17 and throwing the low speed gear into operation.

From the foregoing description, it can be seen that I have provided an exceptionally simple means for permitting the operation of a planetary gear transmission by the use of a hand lever.

Changes in details may be made without departing from the spirit or the scope of this invention, but what I claim as new is:

1. The combination with an automobile including a planetary gear transmission having a reverse pedal shaft, a slow speed shaft, and a clutch lever shaft, of means for operating the transmission including a manually operated hand lever, and a rockable shaft rotatably connected with the clutch lever shaft, means connecting the reverse and low speed shaft with the shaft rotatably connected with the clutch lever shaft, and means operated by the hand lever for locking the shaft rotatably connected with the clutch lever shaft therewith and the means operatively connecting the slow speed and reverse shafts with the shaft arranged in alignment with the clutch lever shaft.

2. The combination with a motor vehicle including a planetary transmission having a reverse pedal shaft, a slow speed shaft and a clutch lever shaft, of means for operating the transmission including a hand lever, a rock shaft arranged in alignment with the clutch lever shaft, cranks rotatably mounted upon the rock shaft, means operatively connecting the cranks with the reverse shaft and the slow speed shaft, means for manually rocking the rock shaft, and means operated by the hand lever for locking the rock shaft with the clutch lever shaft and the cranks with the rock shaft.

3. The combination with an automobile embodying a planetary gear transmission having a reverse shaft, a slow speed shaft, and a clutch lever shaft, of means for operating the transmission including a hand lever, a rock shaft rotatably associated with the clutch lever shaft, control rods, means for operating the control rods by the hand lever, clutch collars operatively connected with the control rod and feathered on the rock shaft, cranks rotatably mounted upon the rock shaft, means operatively connecting the cranks with the slow speed and reverse shafts, the clutch collars being adapted to be engaged with the clutch lever shaft and the cranks.

4. The combination with a motor vehicle including a transmission of the planetary gear type having a low speed shaft, a reverse shaft and a clutch lever shaft, of means for operating the transmission including a hand operated lever, a face plate connected with the motor vehicle, a pair of rock shafts carried by the face plate and secured to the reverse shaft and the low speed shaft, and a clutch rock shaft rotatably connected with the clutch shaft of the transmission, a pair of cranks rotatably mounted upon the rock clutch shaft having clutch faces, means operatively connecting the cranks with the first mentioned rock shafts, a foot pedal keyed to the clutch rock shaft, and a pair of clutch collars feathered on the clutch rock shaft, and means for operating the collars from the hand lever for moving the same into engagement with the clutch faces of the cranks and with the clutch shaft of the transmission.

5. The combination with an automobile including a planetary transmission having a reverse pedal shaft, a slow speed shaft, and a clutch lever shaft, of means for operating the transmission including a rock shaft, a foot pedal keyed to the shaft for rocking the same, means connecting the first mentioned shafts with the rock shaft including control levers rotatably mounted on the rock shaft having clutch faces formed thereon, clutch collars feathered on the rock shaft, and a single hand lever for moving the collars into and out of engagement with the clutch faces on the control levers.

In testimony whereof I affix my signature in presence of two witnesses.

EMERSON B. HINDS.

Witnesses:
JOHN DRANT,
ELRE A. MITCHELL.